(12) United States Patent
Tremblay

(10) Patent No.: US 11,065,779 B1
(45) Date of Patent: Jul. 20, 2021

(54) COPING SLED WITH IMPROVED HOLD DOWN CLAMP

(71) Applicant: Noah Tremblay Architectural Millworks, Newfileds, NH (US)

(72) Inventor: Noah E Tremblay, Stratham, NH (US)

(*) Notice: Subject to any disclaimer, the term of this patent is extended or adjusted under 35 U.S.C. 154(b) by 0 days.

(21) Appl. No.: 17/160,438

(22) Filed: Jan. 28, 2021

(51) Int. Cl.
| | |
|---|---|
| *B27C 5/06* | (2006.01) |
| *B25B 1/14* | (2006.01) |
| *B25B 1/06* | (2006.01) |
| *B25B 1/04* | (2006.01) |
| *B25B 1/02* | (2006.01) |
| *B27B 25/10* | (2006.01) |

(52) U.S. Cl.
CPC ............ *B27C 5/06* (2013.01); *B25B 1/02* (2013.01); *B25B 1/04* (2013.01); *B25B 1/06* (2013.01); *B25B 1/14* (2013.01); *B27B 25/10* (2013.01)

(58) Field of Classification Search
CPC .... B25B 1/02; B25B 1/04; B25B 1/06; B25B 1/14; B25B 1/2442; B25B 1/2473; B25B 3/00; B25B 5/00; B25B 5/067; B25B 5/125; B25B 5/12; B25B 5/103; B25B 5/127; B25B 5/068; B27C 5/06; B27B 25/10

USPC .. 269/291, 228, 73, 156, 56, 58, 63, 67, 69, 269/79

See application file for complete search history.

(56) References Cited

U.S. PATENT DOCUMENTS

| | | | | |
|---|---|---|---|---|
| 1,231,533 | A * | 6/1917 | Clark | B25B 5/12 |
| | | | | 269/94 |
| 4,300,754 | A * | 11/1981 | Lawrence | B23K 37/0435 |
| | | | | 269/208 |
| 9,162,367 | B2 | 10/2015 | Williams | |
| 9,440,371 | B2 | 9/2016 | Van Valkenburg | |
| 2008/0197555 | A1* | 8/2008 | Gregoire | B27B 25/10 |
| | | | | 269/220 |
| 2015/0114521 | A1* | 4/2015 | Tower | B27C 5/06 |
| | | | | 144/371 |

* cited by examiner

*Primary Examiner* — Tyrone V Hall, Jr.
*Assistant Examiner* — Seahee Hong
(74) *Attorney, Agent, or Firm* — Sarita L. Pickett, esq.; Patent Negotiator, PLLC

(57) ABSTRACT

A coping sled with improved hold down clamp for clamping a piece of wood while cutting the piece of wood with a cutting tool. More specifically, the coping sled of the present invention provides various systems to eliminate unintended movement and facilitate different types of intended movement: lateral, horizontal, vertical, and pivotal.

9 Claims, 9 Drawing Sheets

COPING SLED WITH IMPROVED HOLD DOWN CLAMP

BACKGROUND OF THE INVENTION

1. Field of the Invention

The present invention relates generally to woodworking tools. Particularly, the present invention relates to a safety device for use with cutting tools.

2. Description of the Prior Art

U.S. Pat. No. 9,440,371 B2 discloses by Van Valkenburg, discloses a holding device and method for engaging a work piece to route an end thereof.

U.S. Pat. No. 9,162,367 by Williams et al, discloses a system and a method of using the system for reproducibly cutting a cove using a table saw.

SUMMARY OF THE INVENTION

Advantages and Differences of Invention Over Known Prior Art

The present invention is a system of assemblies used to assist in holding wood pieces while cutting. The present adaptive system has flexible physical implementations and can be provided as part of multiple systems and configurations. One embodiment of the present invention includes a system having increased operation and interface capabilities. Further extending this flexibility, a system module may have single or multiple height adaptive systems.

It is an object of the present invention to provide a coping sled capable of protecting a user from the cutting tool itself while holding the wood piece itself in a secure position. It is another object of the present invention to provide a coping sled capable of interacting with cutting tools by multiple manufacturers having different specifications. It is a further object of the present invention to provide a coping tool capable of supporting wood having multiple types, styles, widths, heights, and lengths. It is yet another object of the invention to provide a coping tool capable of facilitating different types of intended and precise movement in each of the following directions: lateral, horizontal, vertical, and pivotal.

The present invention achieves these and other objectives by providing a coping sled with improved hold down clamp for clamping a piece of wood while cutting the piece of wood with a cutting tool. A coping sled according to this invention has a deck having a working area capable of supporting this piece of wood. A clamping foot of this coping sled is capable of holding the piece of wood in place with respect to the deck.

The sled has a first brace assembly with a first and a second mast. Each of the masts are fixedly secured to the deck and define a first gap therebetween. The sled has at least a second brace assembly with a third and a fourth mast. The third and fourth mast are fixedly secured to the clamping foot and define a second gap therebetween. A plurality of corresponding apertures is present on each of the first, second, third, and fourth masts at designated vertical intervals.

A pivoting arm has a main shaft with a first end and a second end. The main shaft has a second plurality of apertures at designated horizontal intervals extending from the first end to the second end.

A first locking pin securely interacts with a first pair of corresponding apertures of the first brace assembly and a first of the plurality of apertures at the first end of the main shaft of the pivoting arm. A second locking pin securely interacts with a second pair of corresponding apertures of the second brace assembly and a second of the plurality of apertures of the main shaft of the pivoting arm. The first locking pin is releasably detachable, such that the first brace assembly and the first end of the main shaft of the pivoting arm may be releasably secured to one another. Furthermore, the first locking pin may be releasably detachable, such that the first brace assembly and the first end of the main shaft of the pivoting arm may be releasably secured in varying vertical and horizontal relationships to one another.

The second locking pin may also be releasably detachable, such that the second brace assembly and the main shaft of the pivoting arm may also be releasably secured to one another. Alternatively, the second locking pin may be releasably detachable, such that the second brace assembly and the main shaft of the pivoting arm may be releasably secured in varying vertical and horizontal relationships to one another.

The coping sled may have a guiding system with a main rail with a leading end and a trailing end. The main rail may have a first rail configuration in which the main rail is positioned a first distance away from an inward side of the deck, and at least a second rail configuration in which the main rail is positioned a second distance away from the inward side of the deck.

The deck of the coping sled may also have a plurality of apertures having a first diameter being greater than a second diameter so that fasteners which extend through the apertures in the deck are not visible when the deck is viewed from the side. The coping sled may also have handles to secure the deck and facilitate further movement. Indeed, the coping sled is designed to facilitate different types of intended and precise movement in each of the following directions: lateral, horizontal, vertical, and pivotal.

A coping sled according to the present invention, with improved hold down clamp for clamping a piece of wood while cutting the piece of wood with a cutting tool, may also be described in the following manner. This coping sled may have a deck with a working area capable of supporting the piece of wood, and a clamping foot capable of holding the piece of wood with respect to the deck.

A guiding system of this coping sled may have a first and a second rail configuration, capable of facilitating precise horizontal and lateral movement of the deck with respect to the cutting tool.

The coping sled according to the present invention may have a first brace fixedly secured to the deck, a second brace fixedly secured to the clamping foot, and a main shaft extending between the first brace and the second brace. An adjustment system of this coping sled may have a plurality of corresponding apertures on each of the first brace, second brace, and main shaft, at designated intervals. The adjustment system may also have at least a first and second locking pin capable of releasably detaching and reattaching the first brace, second brace, and main shaft, at said designated intervals. This would enable this coping sled to be capable of facilitating precise, intended movement as specific intervals in each of lateral, horizontal, vertical, and pivotal directions.

DETAILED DESCRIPTION OF THE INVENTION

Figure 1:
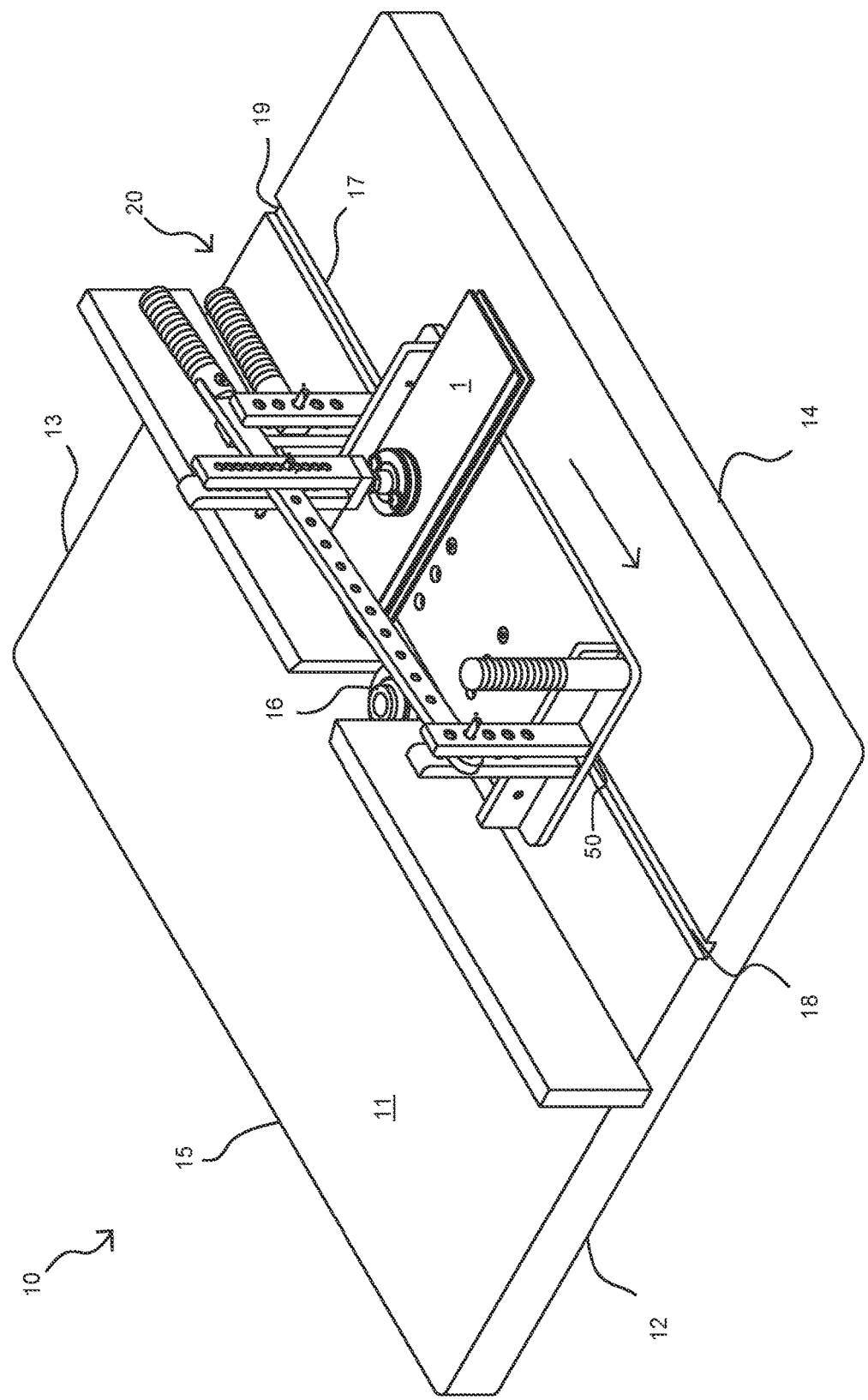
FIG. 1 is a perspective view of one embodiment of the present invention as being used with a wood shaper.

The preferred embodiment of the present invention is illustrated in FIGS. 1-9. FIG. 1 shows a perspective view of a coping sled according to the present invention being used with a wood shaper 10. Most wood shapers 10 have a cutting tool 16 which is fixed on table 11, and the wood piece 1 is moved on the surface of the table 11 in a direction in relationship to the cutting tool 16. For purposes of discussion in this specification, the side in the direction in which the wood moves towards is generally referred to as the leading side, while the side in the direction in which the wood moves away from is generally referred to as the trailing side.

Figure 2:
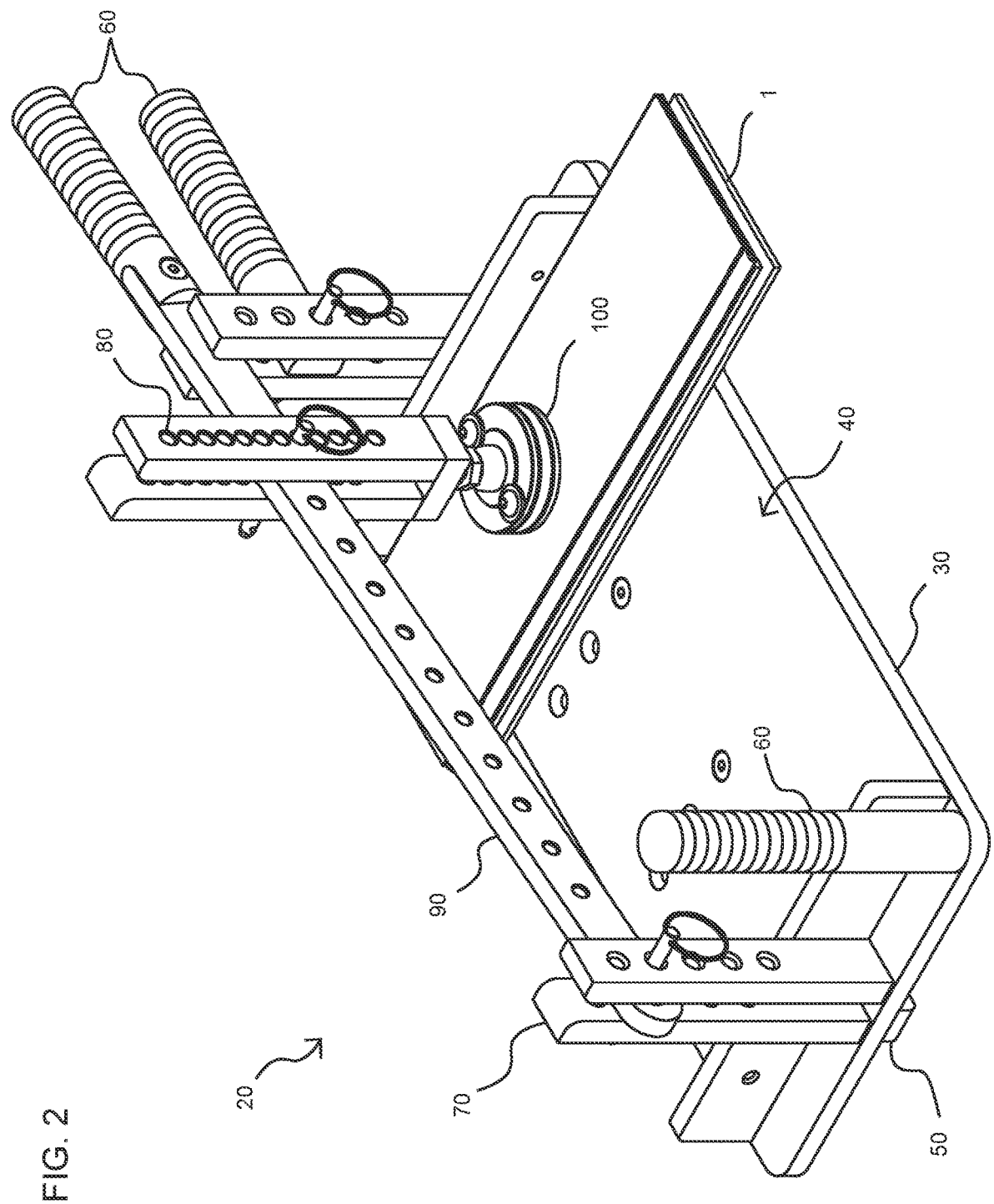
FIG. 2 is a closer perspective view showing the workplace of the embodiment shown in FIG. 1.

FIG. 2 shows a perspective view of the several adjustable systems and components of one embodiment of the coping sled system 20 of the present invention. It is to be understood that the piece of wood 1 is not part of the invention but illustrated only to further show how the invention might be used. Specifically, a deck 30, working area 40, guiding system 50, handles 60, brace assemblies 70, height adjustment systems 80, pivoting arm 90, and clamping foot 100. Each assembly is discussed in greater detail below and with reference to various views and figures which illustrate particular components of those systems in greater detail. However, before discussing each assembly in greater detail, a brief discussion of the variability provided by various configurations will be provided first.

First, Second, and Third Configurations

Figure 3:
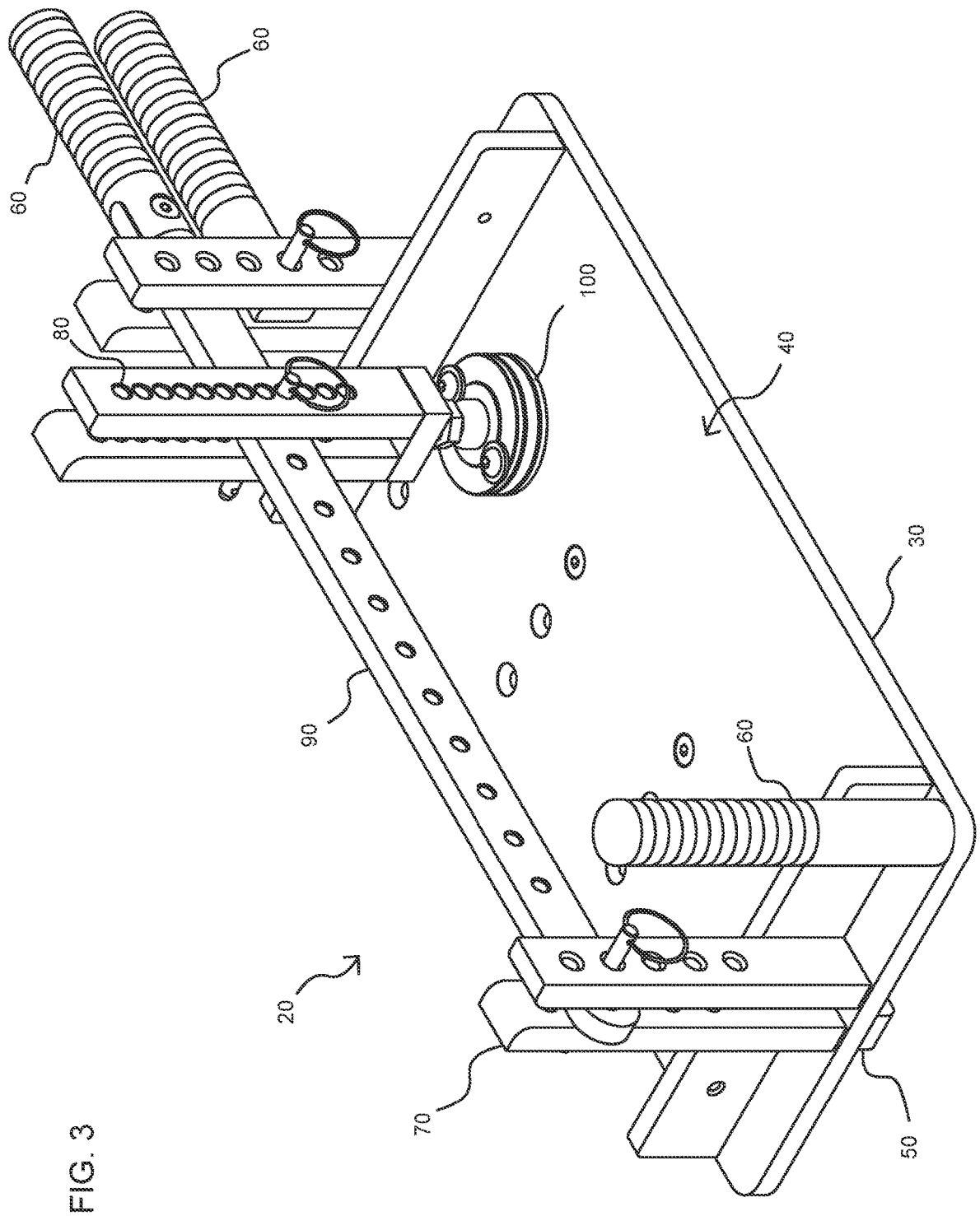
FIG. 3 is a perspective view showing the workplace of the embodiment shown in FIG. 2 with the pivoting arm shown in a first configuration.
Figure 4:
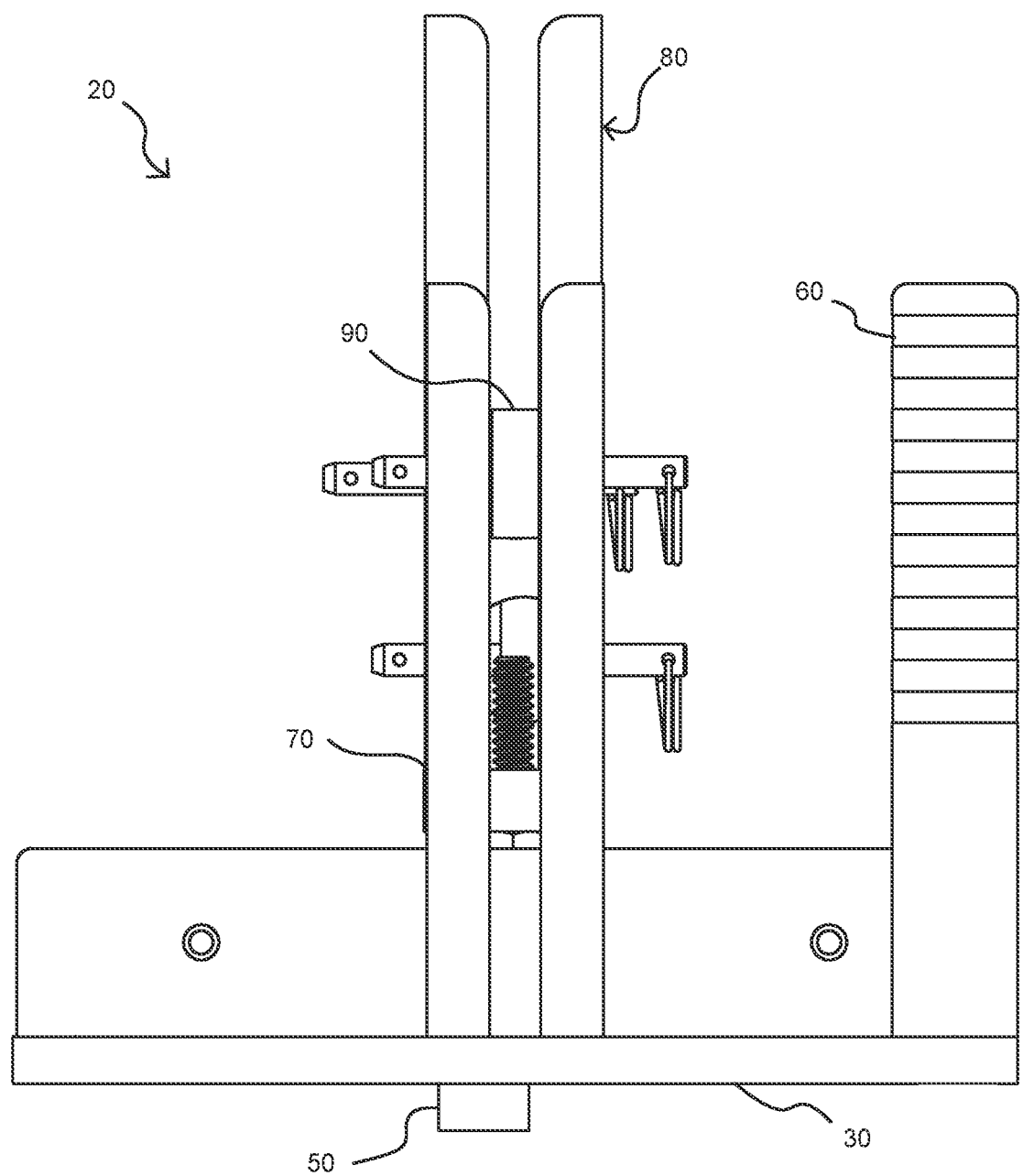
FIG. 4 is a leading/left view of the embodiment shown in FIG. 3 with the pivoting arm shown in the first configuration.
Figure 5:
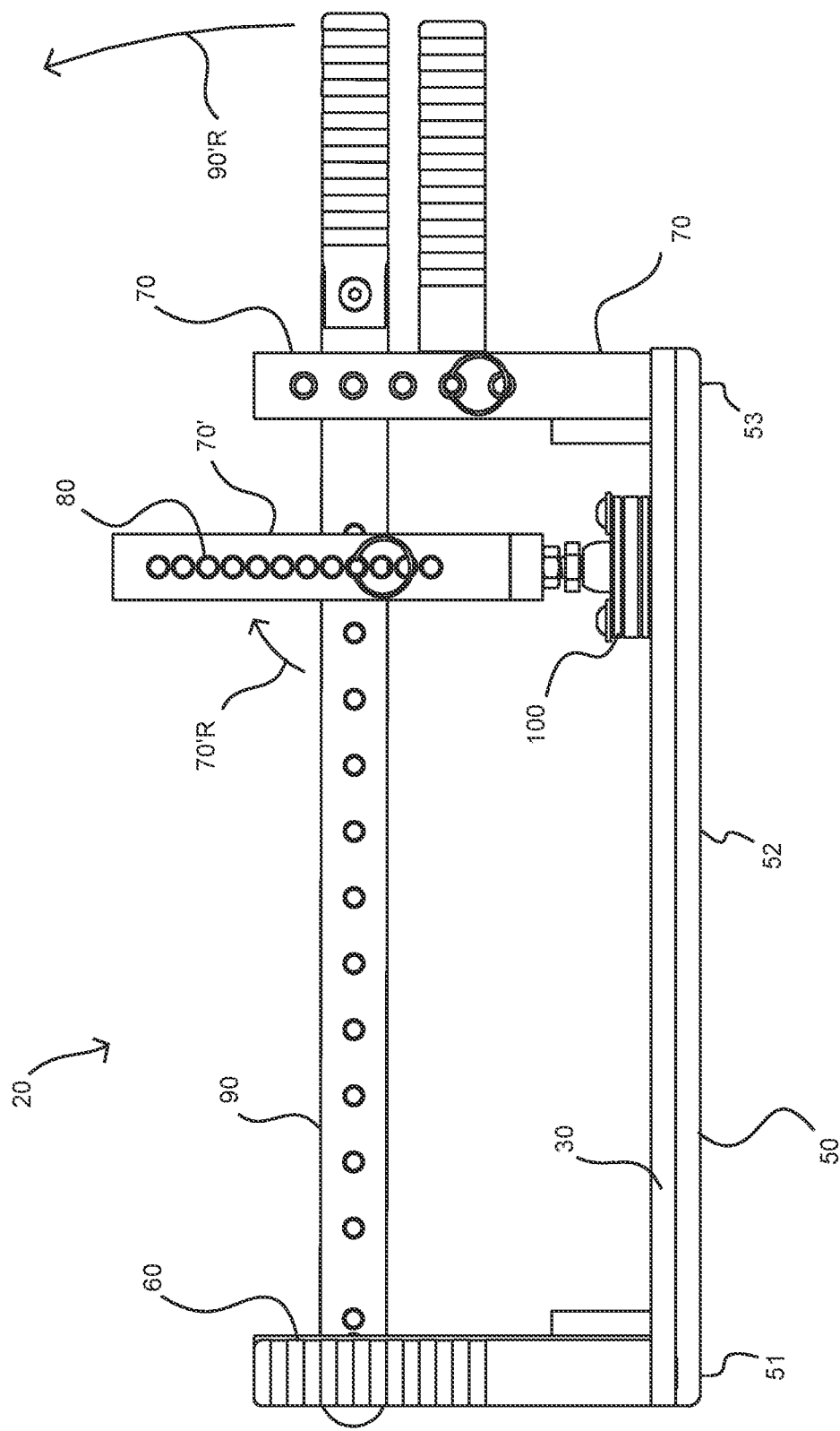
FIG. 5 is a front/outward view of the embodiment shown in FIG. 3 with the pivoting arm shown in in the first configuration.
Figure 6:
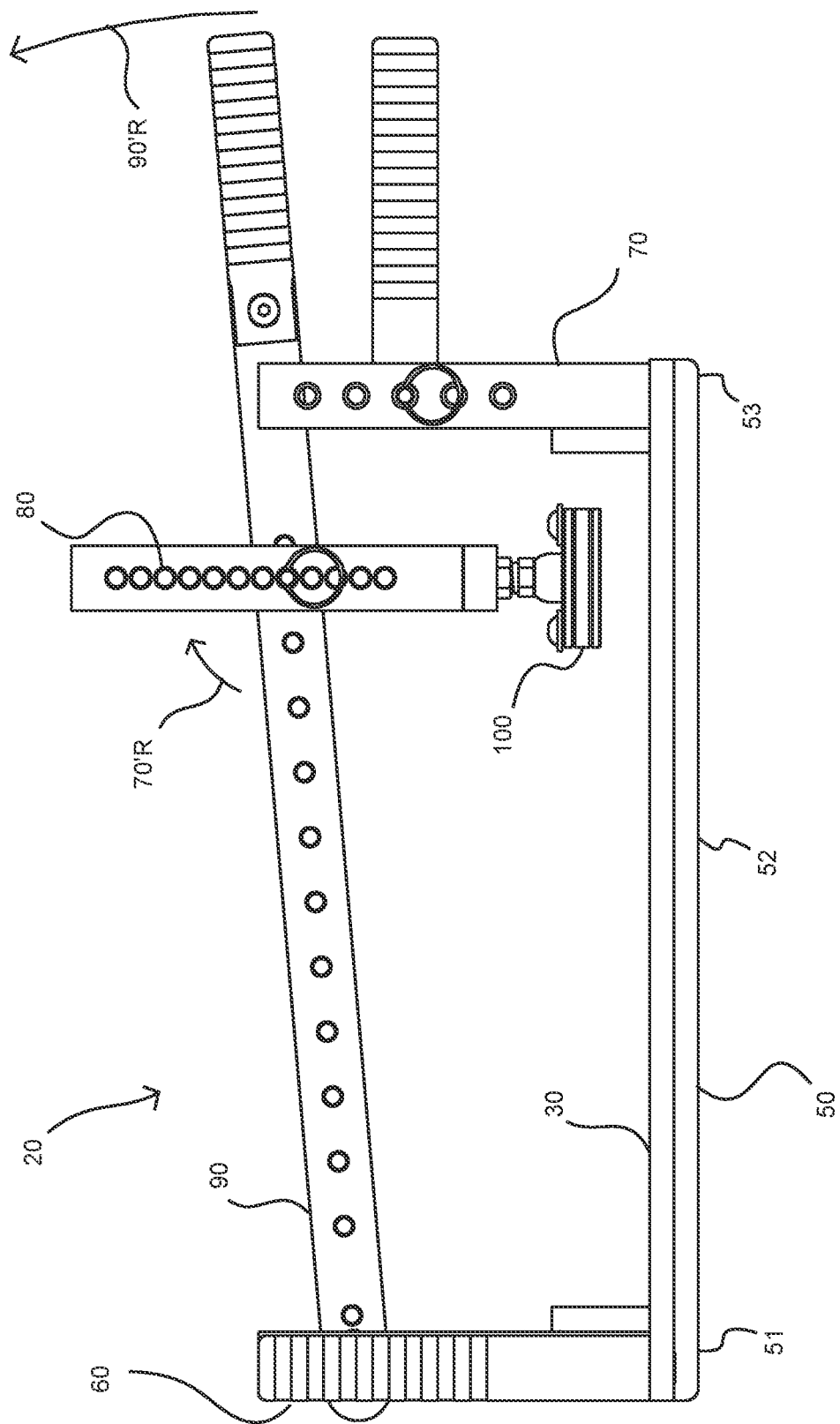
FIG. 6 is a front/outward view of the embodiment shown in FIG. 3 with the pivoting arm shown in a second configuration.

FIGS. 3-7 show various views of the embodiment of the coping sled system 20 of the present invention with the pivoting arm 90 in a first, second, and third configuration(s). FIGS. 3, 4, and 5 provide various prospective views of the embodiment of the coping sled system 20 with the pivoting arm 90 in a first configuration. Specifically, FIG. 3 is an upper left perspective view, FIG. 4 is a leading point and left view, while FIG. 5 is a front/outward view of the embodiment shown in FIG. 3 with the pivoting arm 90 shown in the first configuration.

As shown in FIG. 3, without the presence of the wood piece 1, the lift arm 90 is capable of rotating downwards towards the deck 30, and the lift arm 90 is then capable of resting upon the upper surface of the deck 30. In the first configuration, as shown in FIG. 5, the lift arm 90 can be parallel to the deck 30.

Releasing the pin 94 from the brace assembly 70' and lifting the lift arm 90 enables the height position of the clamping foot 100 to be adjusted with respect to the brace assembly 70' and the horizontal position of the brace assembly 70' to be adjusted with respect to the working area 40. Once the appropriate height and width position has been chosen, the pin 84 can be replaced and secured into the chosen hole 94 of the lift arm 90 and the chosen aperture 81 of the brace assembly 70' supporting the clamping foot 100.

Once secured, lifting the handle 60 of the lift arm 90 counterclockwise causes the lift arm 90 to rotate 90'R about a rotation point at the first lift arm end 92. The lift arm 90 can be further lifted counterclockwise from the first configuration shown in FIG. 5 to a second configuration shown in FIG. 6 to a third configuration shown in FIG. 7. The first configuration having the lift arm 90 in a generally 0-degree angle relative to the deck 30. The second configuration having the lift arm 90 in a generally 10-degree to 30-degree angle relative to the deck 30. The third configuration having the lift arm 90 in a generally 50-degree to 70-degree angle relative to the deck 30. The lift arm 90 is capable of being rotated counterclockwise until the lift arm 90 is in a generally 180-degree to 230-degree angle relative to the first position which is parallel to the deck 30 (not shown).

As the lift arm 90 is raised from the first configuration, the brace assembly 70' supporting the clamping foot 100 is able to freely rotate 70'R in a clockwise direction about a pin 84 extending through one of the arm holes 94. As shown, in the first configuration, shown in FIG. 5, the brace assembly 70' is in a generally 90-degree angle relative to the lift arm 90. The second configuration shows the brace assembly 70' in a generally 100-degree to 120-degree angle relative to the lift arm 90. The third configuration has the brace assembly 70' in a generally 130-degree to 150-degree angle relative to the lift arm 90. The brace assembly 70' is capable of being rotated clockwise even further from the third configuration, until the brace assembly 70' is in a generally 160-degree to 170-degree angle relative to the lift arm 90 (not shown).

Coping Sled Deck 30

The deck 30 of the coping sled 20 has a leading side 31 and a trailing side 32, where the leading side 31 faces the direction of forward movement and the trailing side 32 is opposite the leading side 31. The leading side 31 and trailing side 32 of the deck 30 have a distance of between 12 and 20 inches, preferably between 14 and 18 inches, and more preferably about 16 inches.

The terms front and rear were considered, however, as a user's position may change, the relative terms rear and front are also subject to change. For this reason, the side of the deck 30 parallel to and facing outward from the cutting tool 16, is simply referred to as the outward side 33. Opposite the outward facing side 33, the side of the deck 30 parallel to and facing inward towards the cutting tool 16, is simply referred to as the inward side 34. The outward side 33 and the inward side 34 of the deck 30 have a measurement of between 2 and 14 inches, preferably between 6 and 10 inches, and more preferably about 8 inches.

For a rectangular-shaped deck 30, together the leading side 31, trailing side 32, outward side 33, and inward side 34 form the four main sides and thus the perimeter of the deck 30. The vertices of these sides 31, 32, 33, 34 are often chamfered and rounded in order to reduce sharp edges where the sides meet. Likewise, the deck 30 has an upper surface 35 which has a chamfered joining with the sides 31, 32, 33, 34 at that meeting edge.

The deck 30 itself has a thickness of between ⅛ and ⅝ inches, preferably between ⅖ and ⅘ inches, and more preferably about ⅜ inches.

Fasteners 36, 37, 38

The thickness of the deck 30 is sufficient to enable fully supporting the weight of the wood piece 1 and the attachment of all the other assembly components 43, 44, 50, 60, 70, 90, 100 of the system via a plurality of fasteners 36, 37, 38.

A first set of fasteners 36 are projected upwards from a bottom surface of the deck 30 through apertures 39 which extend through the entire thickness of the deck 30. The first set of fasteners 36 fixedly engage optional handles 60 and brace assemblies 70 to the upper surface 35 of the deck 30.

A second set of fasteners 37 are projected downwards from the upper surface 35 of the deck 30 through further apertures 39 which also extend through the entire thickness of the deck 30. The second set of fasteners 37 releasably and fixedly engage the main rail 53 of the guiding system 50 to the bottom surface of the deck 30.

A third set of fasteners 38 are projected upwards from a bottom surface of the deck 30 through apertures 39 which again extend through the entire thickness of the deck 30. The third set of fasteners 37 fixedly engage a leading fence 43 and a trailing fence 44 to the upper surface 35 of the deck 30.

When the fasteners 36, 37, 38 are threaded screws with enlarged heads, each aperture 39 has a first diameter 56 which is wider than a head of a corresponding fastener 36, 37, 38 and a second diameter 57 opposite and smaller than the first diameter 56. Specifically, the head diameter is usually between 0.4 inches and 0.6 inches, preferably between 0.48 inches and 0.531 inches, and more preferably about 0.5 inches. Thus, the first diameter 56 is usually between 0.4 inches and 0.6 inches, preferably between 0.48 inches and 0.531 inches, and more preferably about 0.5 inches. The second diameter 57 is usually between 0.1 inches and 0.3 inches, preferably between 0.24 inches and 0.28 inches, and more preferably about 0.2656 inches.

Figure 8:
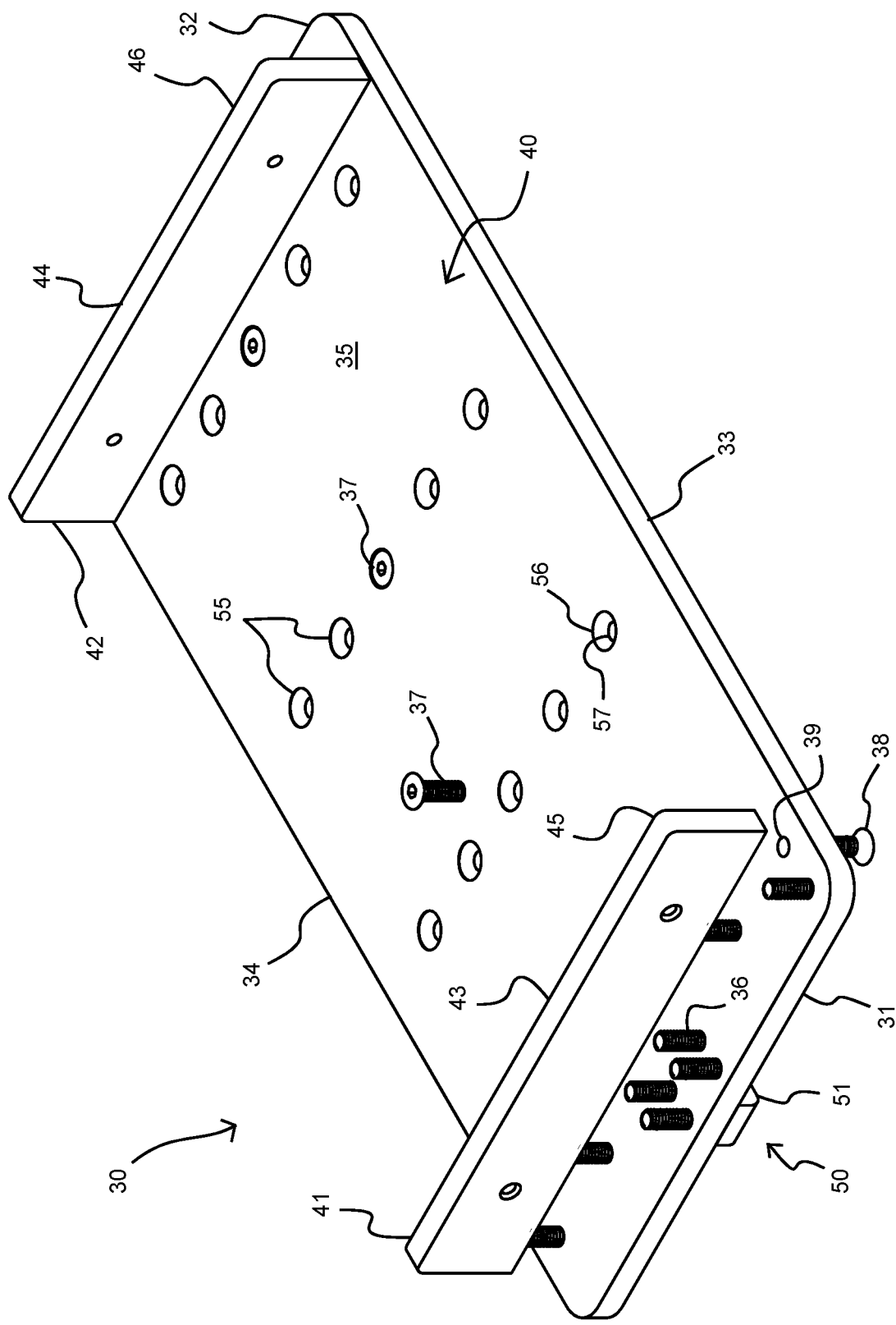
FIG. 8 is a partially exploded perspective view of the deck, working area, and guiding system of the present invention of a further embodiment, similar to the embodiment shown in FIG. 1.

As can be more readily seen in the view shown in FIG. 8, by having an aperture 39 with a first diameter 56 which is wider than a head of a corresponding fastener 36, 37, 38, each fastener 37 has a head which may be made to be flush with the upper surface 35 of the deck 30. In this manner, the placement of the downward facing fasteners 37 does not impact the placement of the wood piece 1 within the working area 40 along the upper surface 35 of the deck 30.

Similarly, each of the upward facing fasteners 36, 38 has a head which may be made to be flush with the lower surface of the deck 30. In this manner, the placement of the upward facing fasteners 36, 38 does not impact the placement of the main rail 51 of the guiding system 50 on the lower surface of the deck 30.

Working Area 40

Although it may be seen in several figures, reference will generally be made now to FIG. 8. The working area 40 being defined by on either side by first and second fences 43, 44. Specifically, at a distance set back from the leading side 31 of the deck 30, the first leading fence 43 has a first end 41 facing inward, and a second end 45 facing outward. The distance between the leading side 31 of the deck 30 and the edge of the leading fence 43 is usually between 0.6 inches and 1.4 inches, preferably between 0.8 inches and 1.2 inches, and more preferably about 1.0625 inches.

The leading fence 42 generally extends across the entire upper surface 35 from the inward side 34 of the deck 30 to the outward side 33 of the deck 30. The leading fence 42 then usually has a length of between 7 inches and 9 inches, preferably between 7.6 inches and 8.2 inches, and more preferably about 7.9375. The leading fence 42 also usually has a width of between 1 inch and 2 inches, preferably between 1.25 inches and 1.75 inches, and more preferably about 1.5 inches.

Opposite the leading fence 43, a trailing fence 44 has a first end 42 facing inward, and a second end 46 facing outward. The distance between the trailing side 32 of the deck 30 and the edge of the trailing fence 44 is usually between 1 inch and 2 inches, preferably between 1.0 inches and 1.1 inches, and more preferably about 1.0625 inches.

The trailing fence 44 generally extends across the entire upper surface 35 from the inward side 34 of the deck 30 to the outward side 33 of the deck 30. The trailing fence 44 then usually has a length of between 7.2 inches and 8.4 inches, preferably between 7.6 inches and 8.2 inches, and more preferably about 7.9375 inches. The trailing fence 44 also usually has a width of between 0.8 inches and 2.2 inches, preferably between 1.2 inches and 1.7 inches, and more preferably about 1.5 inches.

The space bounded by the leading fence 43 and the trailing fence 44 along the upper surface 35 of the deck 30 is considered the working area 40. The working area 40 is not usually bound along the side facing outward at all, as the wood piece 1 being worked may have a length which is anywhere between 3 and 36 inches.

The working area 40 is bound on the sides designated between the leading fence 43 and the trailing fence 44. The distance between the leading fence 43 and the trailing fence 44 is between 10 and 16 inches, preferably between 12 and 14 inches, and more usually 13.125 inches. This facilitates working with wood pieces 1 that have a width which is anywhere between ½ inches and 20 inches, preferably between 1 and 15 inches, and more usually between 2 and 12 inches.

Guiding System 50

Details of the adjustable guiding system 50 is shown in FIGS. 1, 5, 6, and 8. As shown in more detail in FIG. 1, the guiding system 50 is capable of engaging an indented groove 17 of the table 11. Specifically, the guiding system 50 is capable of reversibly and slidingly engaging the concave valley of the groove 17 of the table 11. Doing so, the guiding system 50 enables the coping sled 20 to travel in a direction away from the trailing end 19 of the groove 17 towards the leading end 18 of the groove 17. Even more advantageously, the guiding system 50 prevents the coping system 20 from traveling in a direction at an angle which is not parallel to the groove 17, thus preventing angular deviations in the cut of the wood 1.

The guiding system 50 has a main rail 52 which reversibly and slidingly engages the correspondingly concave valley of the groove 17 of the table 11. The main rail 52 has a first leading end 51 and a trailing end 53 and an overall length of between 10 and 30 inches, preferably between 14 inches and 18 inches, and more preferably about 16 inches. This corresponding shaped main rail 52 is what facilitates the guiding system 50 in enabling the coping sled 20 to travel along the groove 17.

However, one of the difficulties facing users is the competitive nature of the field. Simply put, not all tables 11 have rails 17 which are present at the exact same distance, a standard distance, away from the cutting tool 16. Also, there are times when a user desires to have the main weight of the coping sled 20 and wood piece 1 balanced differently in order to more stably support the weight of longer and heavier pieces of wood.

To meet this need, one advantageous feature of the present invention is a plurality of rail configurations which enable the main rail 52 to be positioned differently laterally with respect to the deck 30. Specifically, the rail configurations enable the main rail to be positioned either towards the front outward facing side 33 of the deck 30 or closer to the rear inward facing side 34 of the deck 30. Each rail configuration is facilitated by a different row 55 of apertures 39 within the deck 30.

These apertures 39 have a first diameter 56 which is wider than a head of a corresponding fastener 37 and a second diameter 57 opposite and smaller than the first diameter 56 which is wider than a shaft of the corresponding fastener 37. Unlike the fasteners 38, 36 which are designed to be lockingly engaged, the fasteners 37 which connect the main rail 53, are designed to be reversibly engaged. However, during use, access to the fasteners 37 may be reduced by the presence of the lifting arm 90 and the clamping foot 100.

As previously discussed, the lift arm 90 is capable of being rotated counterclockwise until the lift arm 90 is in a generally 180-degree to 230-degree angle with respect to the deck 30. This leaves the working area 40 and the fasteners 37 completely exposed so that it is possible to switch between one rail configuration to a second rail configuration between uses of the coping sled 20.

A first rail configuration has the rail positioned a first distance away from the inward side 34. A second rail configuration has the rail positioned a second distance away from the inward side 34. A third rail configuration would facilitate the rail being positioned a third distance away from the inward side 34, etc. The number of alternative rail configurations may vary. The embodiment shown in FIG. 2, for example, shows three rail configurations. Alternatively, the embodiment shown in FIG. 8 shows five rail configurations. Thus, the present invention enables alternative positioning vertically, horizontally, and laterally.

Handles 60

Four different embodiments of handles 60 are shown within FIGS. 1-7, and 9. Starting with FIG. 2 a first embodiment of a handle 60 is identified which is fixedly connected to the pivoting arm 90. A second embodiment of a handle 60 is fixedly connected to the deck 30. A third embodiment of a handle 60 is releasably connected to a fixed brace assembly 70. Finally, in FIG. 9 a fourth embodiment of a handle 60 is identified, this handle 60 is releasably connected to a movable brace assembly 70.

Figure 9:
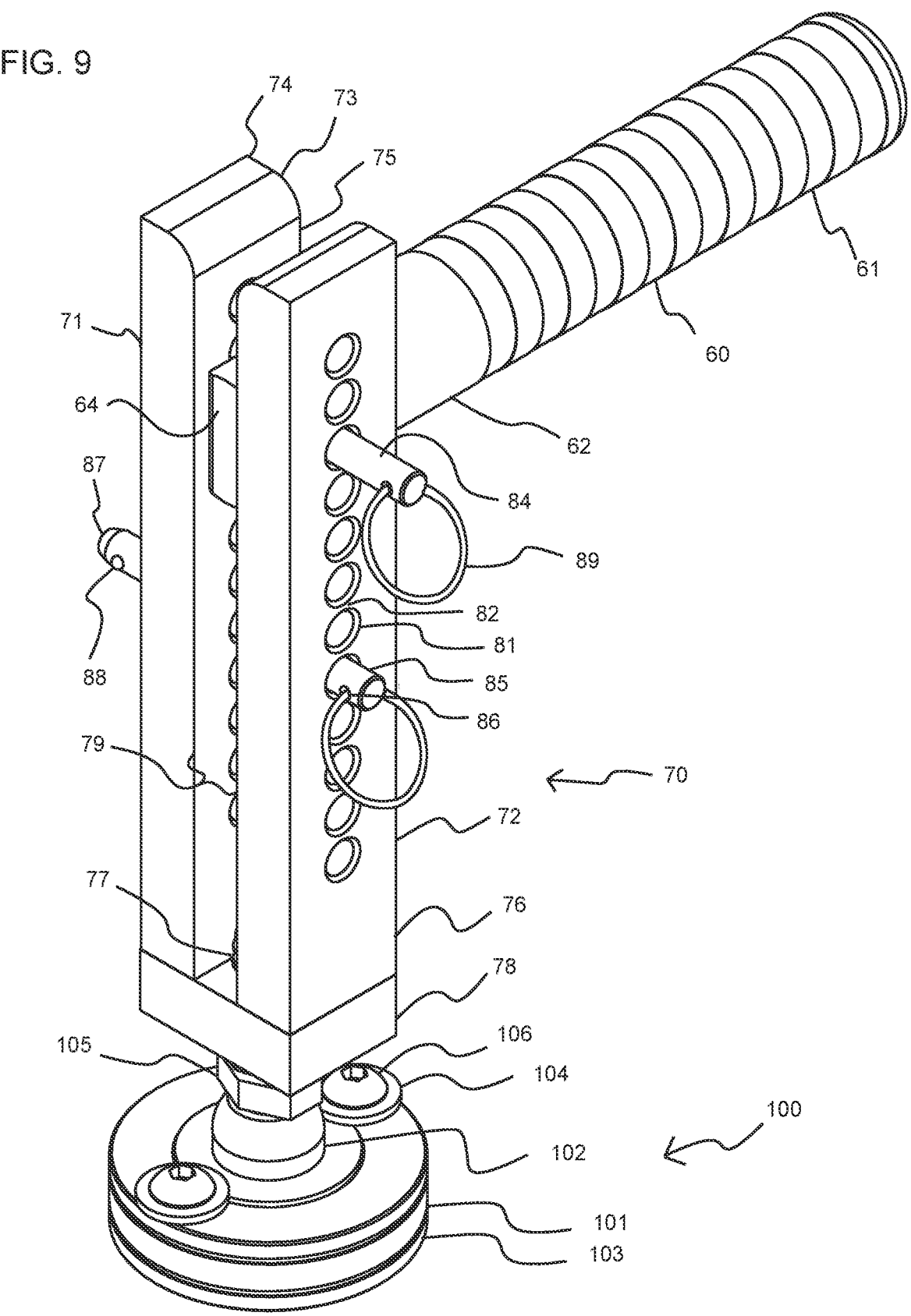
FIG. 9 is a perspective view of the handles, brace assembly, height adjustment system, and clamping assembly of the present invention of a further embodiment, similar to the embodiment shown in FIG. 1.

As this final illustration is enlarged, it is easier to see the components of the handle 60, and further discussion will be provided with reference to FIG. 9. As seen, the shaft of the handle 60 is generally columnar. A first end of the handle 60 may have corrugation, gnarling, knurling, padding, or a cushioning grip 61. The first end 61 of the handle 60 has an overall length of between 4 inches and 7 inches, preferably between 4.5 inches and 6 inches, and more preferably about 5 inches. The first end 61 of the handle 60 has a diameter of between 0.5 to 2 inches, preferably between 0.9 inches and 1.5 inches, and more preferably about 1 inch.

A second end 64 of the handle 60 is a narrowed rectangular portion 64 which is capable of interfacing with the gap between the two masts 71, 72 of the brace assembly 60. The pin 84 extends through an aperture 63 in the second end 64 of the handle thereby securing the handle 60 in position with respect to the brace assembly 60. The second end 64 of the handle 60 has an overall length of between 0.4 inches and 2 inches, preferably between 0.7 inches and 1.2 inches, and more preferably about 1 inch. The second end 64 of the handle 60 has a thickness of between 0.1 inches and 0.7 inches, preferably between 0.2 inches and 0.6 inches, and more preferably about 0.375 inches. The aperture 63 extends through the entire thickness of the handle 60 and has a diameter of between 0.1 and 0.5 inches, preferably between 0.2 and 0.4 inches, and more preferably about 0.2656 inches.

A transitional portion 62 of the handle 60 facilitates the progression between the broad columnar portion 60 and the narrower rectangular portion 64. The transitional portion 62 of the handle 60 in this embodiment is comprised of a pair of opposing abrupt angled notches cut into opposing sides of the handle 60. The abrupt nature of this transitional portion 62 ensures that the extending surfaces of the notches extend along and abut against adjacent surfaces of the first and second masts 71, 72. The close abutment prevents any inadvertent rotation of the handle with respect to the brace assembly 70.

However, it is to be understood that other embodiments of the transitional portion 62 of the handle 60 may also be of a gradual nature. In these embodiments, the transitional portion 62 of the handle 60 would have a variable thickness which gradually transitions between a circular diameter to the columnar thickness required to interact with the gap between the two masts 71, 72 of the brace assembly 60.

Brace Assembly 70

Also shown in FIG. 9 is one embodiment of a brace 70, an assembly of various components which acts to brace other elements of the coping sled 20. FIG. 2 shows three other different embodiments of brace assemblies 70, 70'. Again however, as FIG. 9 is an enlarged view, discussion of the particular features of the brace assembly 70 will be made with reference towards the embodiment shown therein.

Generally, each embodiment of the brace assemblies 70 ensure that the braced components are prevented from inadvertent lateral movement (from an inward side to an outward side or vice versa) with respect to the deck 30. As such, each brace assembly 70 has a first mast 71 separated by a gap from a second mast 72 opposite the first 71. Each mast 71, 72 has a width of between 0.5 inches and 2 inches, preferably between 0.75 inches and 1.50 inches, and more preferably about 1 inch. Each mast 71, 72 also has a height of between 4 inches and 8 inches, preferably between 5 inches and 7 inches, and more preferably of about 6 inches. Finally, each mast 71, 72 has a thickness of between 0.2 inches and 1 inch, preferably between 0.4 inches and 0.6 inches, and more preferably about 0.5 inches. The gap between the masts 71, 72 has a width of between 0.12 inches and 0.8 inches, preferably between 0.22 inches and 0.7 inches, and more preferably about 0.4 inches.

Each mast 71, 72 has a first curved end 73, and a second fixed end 76. The first curved ends 73 of each respective mast 71, 72 face inward so that a first open width 74 is larger than a second open width. The first open width being between 0.5 inches and 2 inches, preferably between 0.75 inches and 1.50 inches, and more preferably about 0.9 inches. The second open width being the same width as the width of the gap, namely, between 0.12 inches and 0.8 inches, preferably between 0.22 inches and 0.7 inches, and more preferably about 0.4 inches. The gradation between the first and the second open widths acting as a funnel, facilitating easy movement of a shaft end 64 into the gap 79 between the masts 71, 72.

The second fixed ends 76 of each mast are fixed in place via fasteners 36 to the deck 30 or to base 78. Referring back to FIG. 2, two embodiments of the brace assembly are shown with masts fastened to the deck 30, while one embodiment of the brace assembly 70 is shown with masts fastened to a base 78. Regardless, the fixed ends 76 ensure that the gap 79 has only one vertically oriented open mouth—adjacent the curved mast ends 73.

By securing a respective feature (either the lifting arm 90 or handle 60) with a pin 84, each brace assembly 70 embodiment also ensures that no inadvertent vertical movement with respect to the brace assembly is permitted either. Inadvertent horizontal movement is also likewise restricted.

Adjustment System 80

Without further elements, the open vertical mouth of the brace assemblies 70 would not prevent vertical movement of an element with respect to the deck 30. The present invention employs an adjustment system 80 to facilitate different types of intended (and precise) movement: horizontal, straight vertical, and pivoting.

To meet the goals of the inventor, the adjustment system 80 had to be capable of making the components: fixed, moveable, rotatable, and adjustable. To that end, the vertical adjustment system 80 of the present invention has a plurality of removable locking pins 84 which are cooperative and interactive with apertures at distinct intervals 81 in the brace assemblies 70 and holes 94 along the arm shaft 90.

The pins 84 have a first end 85 with an aperture 86 for interacting with pull ring 89 and a second end 87 having a lock button 88. The lock button 88 prevents inadvertent dislocation of the pin from a designated aperture 81. The tensile strength of the pin being strong enough to prevent inadvertent horizontal movement of the relevant component from a trailing end to a leading end with respect to the deck 30. However, the shaft of the pin is also sufficiently smooth, having a coefficient of friction low enough to facilitate rotation of the pin within the corresponding apertures 81.

Pivoting Arm 90

This dual nature of the pins 84 is what enables pivoting of the arm 90 with respect to the deck 30. Specifically enabling releasable vertical and horizontal movement and facilitating rotation movement 70'R of the pivoting arm 90. Rotation 70'R is illustrated from a first configuration in FIGS. 3-5 to a second configuration as in FIG. 6. Rotation 70'R is further illustrated from the second configuration in FIG. 5 to a third configuration as in FIG. 7.

Figure 7:
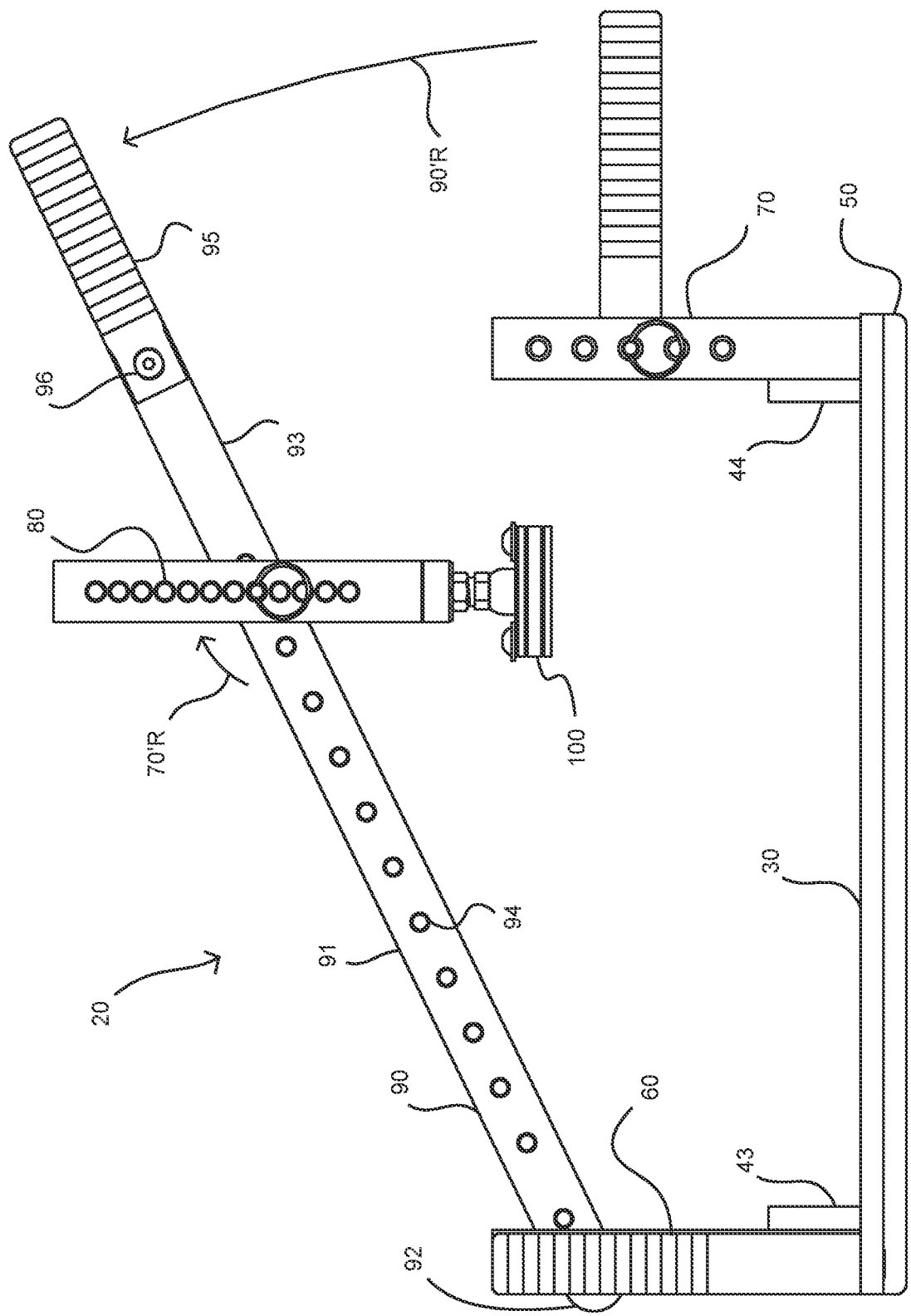
FIG. 7 is a front/outward view of the embodiment shown in FIG. 3 with the pivoting arm shown in a third configuration.

Referring further to FIG. 7, the pivoting arm 90 is shown having a first end 92 which is connected to a first brace assembly 70 via a first pin 84. The main shaft 91 is rectangular and extends from the first end 92 to the second end 93. The main shaft 91 has an overall length of between 12 inches and 24 inches, preferably between 15 and 20 inches, and more preferably about 17.6 inches. The main shaft 91 has a thickness of between 0.12 inches and 0.8 inches, preferably between 0.22 inches and 0.7 inches, and more preferably about 0.375 inches.

The second end 93 of the pivoting arm 90 is connected via bolt 96 to a handle 60 having a handle grip 95. The handle 60 having a handle grip 95 is similar to the handles 60 discussed above, having a columnar portion with padding or knurling 61, and an aperture for connecting with a pin. In the embodiment shown in FIGS. 2-5, the handle has two portions which extend around and sandwich the second end 93 of the pivoting arm 90. However, other embodiments of the pivoting arm 90 have a transitional portion 62 connecting the second end 93 of the main shaft 91 with the handle 60.

Clamping Foot 100

Turning again to FIG. 9, the brace assembly 70 has a base 78 which is shown supporting a clamping foot 100. This assembly 100 may have weighted layers 101 which are connected by bolt 106 to a main foot 103. A swivel 102 connects the main foot 103 to the brace assembly 70 and enables swiveling about the connection point. The main foot 103 having a diameter of between 0.5 inches and 4 inches, preferably between 1 inch and 3 inches, and more preferably about 2.125 inches.

The main foot 103 having a height of between 0.2 inches and 1 inch, preferably between 0.4 inches and 0.7 inches, and more preferably about 0.5 inches. The clamping foot 103 having a weight of between 0.05 pounds and 1.4 pounds, preferably between 0.1 pounds and 0.3 pounds, and more preferably about 0.15 lbs. The features, weight and larger diameter, specified to facilitate assisting in holding the wood piece 1 in place during use without damaging the surface of the wood piece 1 being restrained.

LIST OF REFERENCED ELEMENTS

The following reference numbers are adhered to within the specification to refer to those referenced elements within the drawings of the present application.

| | |
|---|---|
| 1 | wood |
| 10 | wood shaper |
| 11 | table |
| 12 | Table, leading side |
| 13 | Table, trailing side |
| 14 | Table, front side |
| 15 | Table, rear side |
| 16 | Table, cutting tool |
| 17 | Table, rail |
| 18 | Table, rail, leading end |
| 19 | Table, rail, trailing end |
| 20 | coping sled system |
| 30 | deck |
| 31 | deck, leading side |
| 32 | deck, trailing side |
| 33 | deck, outward side |
| 34 | deck, inward side |
| 35 | deck, upper surface |
| 36 | fasteners, first set |
| 37 | fasteners, second set |
| 38 | fasteners, third set |
| 39 | apertures |
| 40 | working area |
| 41 | Fence, leading, inward |
| 42 | Fence, trailing, inward |
| 43 | Fence, leading |
| 44 | Fence, trailing |
| 45 | Fence, leading, outward |
| 46 | Fence, trailing, outward |
| 50 | guiding system |
| 51 | main rail, leading end |
| 52 | main rail |
| 53 | main rail, trailing end |
| 55 | aperture rows |
| 56 | wider open end |
| 57 | smaller internal opening |
| 60 | handles |
| 61 | padding or knurling |
| 62 | transitional portion |
| 63 | aperture for connecting with pin |
| 64 | thinner rectangular shaft portion |
| 70 | brace assembly |
| 71 | first brace mast |
| 72 | second brace mast |
| 73 | curved end |
| 74 | first open width |
| 75 | second open width |
| 76 | secured closed end |
| 77 | connections |
| 78 | base |
| 79 | gap |
| 80 | adjustment system |
| 81 | apertures at intervals |

-continued

| | |
|---|---|
| 82 | distance btw apertures |
| 84 | pins |
| 85 | first pin end |
| 86 | passage |
| 87 | second pin end |
| 88 | lock button |
| 89 | ring |
| 90 | pivoting arm |
| 91 | arm, main shaft |
| 92 | arm, first end |
| 93 | arm, second end |
| 94 | arm, middle holes |
| 95 | arm, handle |
| 96 | arm, handle attachment |
| 100 | clamping foot |
| 101 | weighted layer |
| 102 | swivel assembly |
| 103 | larger foot |
| 104 | washer |
| 105 | nut |
| 106 | bolt |

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A coping sled with an improved hold down clamp for clamping a piece of wood while cutting the piece of wood with a cutting tool, the coping sled comprising:
   a deck having a working area capable of supporting the piece of wood;
   a clamping foot capable of holding the piece of wood with respect to the deck;
   a first brace assembly having a first mast and a second mast, each being fixedly secured to the deck and defining a first gap therebetween;
   a second brace assembly having a third mast and a fourth mast, each being fixedly secured to the clamping foot and defining a second gap therebetween;
   a plurality of corresponding apertures on each of the first mast, the second mast, the third mast, and the fourth mast at designated vertical intervals;
   a pivoting arm having a main shaft with a first end and a second end, the main shaft having a plurality of apertures at designated horizontal intervals from the first end to the second end;
   a first locking pin securely interacting with a first pair of corresponding apertures of the first brace assembly and a first of the plurality of apertures at the first end of the main shaft of the pivoting arm; and
   a second locking pin securely interacting with a second pair of corresponding apertures of the second brace assembly and a second of the plurality of apertures of the main shaft of the pivoting arm;
   wherein the first locking pin is releasably detachable, such that the first brace assembly and the first end of the main shaft of the pivoting arm may be releasably secured to one another.

2. The coping sled of claim 1, wherein the second locking pin is releasably detachable, such that the second brace assembly and the main shaft of the pivoting arm may be releasably secured to one another.

3. The coping sled of claim 2 wherein the second locking pin is releasably detachable, such that the second brace assembly and the main shaft of the pivoting arm may be releasably secured in varying vertical and horizontal relationship to one another.

4. The coping sled of claim 1 wherein the first locking pin is releasably detachable, such that the first brace assembly and the first end of the main shaft of the pivoting arm may be releasably secured in varying vertical and horizontal relationship to one another.

5. The coping sled of claim 1, further comprising a guiding system having a main rail with a leading end and a trailing end, wherein the main rail has a first rail configuration in which the main rail is positioned a first distance away from an inward side of the deck, and wherein the main rail has at least a second rail configuration in which the main rail is positioned a second distance away from the inward side of the deck.

6. The coping sled of claim 1, wherein the deck further comprising a plurality of apertures having a first diameter being greater than a second diameter.

7. The coping sled of claim 1, further comprising at least one handle.

8. The coping sled of claim 1, wherein the coping sled facilitates different types of intended movement: lateral, horizontal, vertical, and pivotal.

9. A coping sled with an improved hold down clamp for clamping a piece of wood while cutting the piece of wood with a cutting tool, the coping sled comprising:
   a deck having a working area capable of supporting the piece of wood;
   a clamping foot capable of holding the piece of wood with respect to the deck;
   a guiding system having a first rail configuration and a second rail configuration, capable of facilitating precise horizontal and lateral movement of the deck with respect to the cutting tool;
   a first brace being fixedly secured to the deck;
   a second brace being fixedly secured to the clamping foot;
   a main shaft extending between the first brace and the second brace; and
   an adjustment system having a plurality of corresponding apertures on each of the first brace, the second brace, and the main shaft, at designated intervals, and at least a first locking pin and a second locking pin capable of releasably detaching and reattaching the first brace, the second brace, and the main shaft, at said designated intervals;
   whereby the coping sled being capable of facilitating precise, intended movement at specific intervals in each of lateral, horizontal, vertical, and pivotal directions.

* * * * *